(12) United States Patent
Toth et al.

(10) Patent No.: US 8,505,926 B2
(45) Date of Patent: Aug. 13, 2013

(54) LOW TORQUE SHAFT SEAL WITH IMPROVED SEAL ELEMENT BOND JOINT

(75) Inventors: David M. Toth, Brighton, MI (US); Frederick R. Hatch, Ann Arbor, MI (US); Brent Sedlar, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 293 days.

(21) Appl. No.: 12/722,109

(22) Filed: Mar. 11, 2010

(65) Prior Publication Data

US 2011/0221143 A1    Sep. 15, 2011

(51) Int. Cl.
*F16J 15/32*    (2006.01)
(52) U.S. Cl.
USPC .......................................................... 277/569
(58) Field of Classification Search
USPC ................ 277/569, 558, 560, 562, 570, 572, 277/559
See application file for complete search history.

(56) References Cited

U.S. PATENT DOCUMENTS

| | | | | |
|---|---|---|---|---|
| 2,248,761 | A | * | 7/1941 | Kosatka .......................... 277/569 |
| 2,804,325 | A | * | 8/1957 | Riesing .......................... 277/559 |
| 3,489,420 | A | * | 1/1970 | Woodling ....................... 277/558 |
| 4,334,687 | A | * | 6/1982 | Holzer et al. ................... 277/430 |
| 4,501,431 | A | * | 2/1985 | Peisker et al. .................. 277/559 |
| 4,650,196 | A |   | 3/1987 | Bucher et al. |
| 4,689,190 | A | * | 8/1987 | Peisker et al. .................. 264/159 |
| 5,039,112 | A | * | 8/1991 | Ulrich et al. ................... 277/562 |
| 5,346,662 | A | * | 9/1994 | Black et al. .................... 264/138 |
| 5,421,741 | A | * | 6/1995 | David et al. .................... 439/405 |
| 5,577,741 | A | * | 11/1996 | Sink ............................... 277/559 |
| 5,615,894 | A |   | 4/1997 | vom Schemm |
| 6,182,975 | B1 |   | 2/2001 | Matsushima et al. |
| 6,336,638 | B1 |   | 1/2002 | Guth et al. |
| 6,354,598 | B1 | * | 3/2002 | Huang ........................... 277/551 |
| 6,513,810 | B1 |   | 2/2003 | Pataille |
| 6,561,518 | B1 |   | 5/2003 | Lutaud |
| 6,666,459 | B1 |   | 12/2003 | Hufnagel |
| 6,715,768 | B1 |   | 4/2004 | Bock et al. |
| 6,789,805 | B2 |   | 9/2004 | Sassi |
| 6,921,082 | B2 |   | 7/2005 | Lutaud |
| 2004/0173973 | A1 |   | 9/2004 | Kammerer et al. |
| 2006/0012128 | A1 |   | 1/2006 | Lutaud |
| 2006/0091614 | A1 |   | 5/2006 | Oricchio |

FOREIGN PATENT DOCUMENTS

| | | |
|---|---|---|
| DE | 3607662 | 9/1987 |
| DE | 3613220 A1 | 10/1987 |
| FR | 2871211 A1 | 12/2005 |
| WO | 9429622 | 6/1993 |
| WO | 2009/152389 A2 | 12/2009 |

* cited by examiner

*Primary Examiner* — Vishal Patel
(74) *Attorney, Agent, or Firm* — Robert L. Stearns; Dickinson Wright, PLLC

(57) ABSTRACT

A shaft seal assembly includes a metal case having a wall extending cylindrically about a central axis with an annular leg extending radially inwardly from the wall toward the central axis. An elastomeric material is bonded to the leg, and a PTFE seal element is attached to the elastomeric material at a bond joint. The bond joint is spaced radially inwardly from the leg and in radial alignment with the leg and inhibits the elastomeric material from flexing. As such, the elastomeric material is isolated or substantially isolated from impacting the performance of the PTFE seal element during use. Accordingly, the bond joint provides a reliable seal of the PTFE seal element against a running surface of a shaft or wear sleeve.

9 Claims, 1 Drawing Sheet

LOW TORQUE SHAFT SEAL WITH IMPROVED SEAL ELEMENT BOND JOINT

BACKGROUND OF THE INVENTION

1. Technical Field

This invention relates generally to seal assemblies, and more particularly to rotary shaft seal assemblies having a PTFE seal lip.

2. Related Art

Shaft seals are commonly used throughout numerous types of vehicle applications. Aside from the shaft seal establishing a reliable seal against a running surface of a rotating shaft or wear sleeve, both to prevent the ingress of contamination and the egress of desirable lubrication, it is desirable that the seal provide a minimal running torque against the shaft. A reduced running torque of the seal helps to enhance the overall fuel economy of the vehicle, as lower torque requires less parasitic horse power to turn the shaft, such as a crankshaft, for example, due to less drag produced by the shaft seal against the running surface of the shaft. As such, it is known to use low friction materials to provide seal lips for engagement with the running surface. One such known material is polytetrafluoroethylene (PTFE). In order to achieve an optimal seal, it is desired to provide a sealing surface on the PTFE seal lip as the sole, active portion forming the seal. Further, it is desirable to control the flexing of the PTFE seal lip in use, thereby allowing a reliable seal to be attained.

SUMMARY OF THE INVENTION

A rotary shaft seal assembly includes a metal case having a wall extending cylindrically about a central axis with an annular leg extending radially inwardly from the wall toward the central axis. An elastomeric material is bonded to the leg, and a PTFE seal element is attached to the elastomeric material at a bond joint. The bond joint is spaced radially inwardly from the leg and in radial alignment with the leg.

The bond joint provides the PTFE seal element with an ability to form and maintain a reliable seal against a running surface of a shaft or wear sleeve. The bond joint allows the PTFE seal element to flex as needed during use, while at the same time inhibiting the elastomeric material from flexing. Accordingly, the elastomeric material is isolated or substantially isolated from the flexing movement of the PTFE seal element, and thus, the elastomeric material does not detract from the performance of the PTFE seal element during use. Further, the loads transferred through the bond joint are minimized, thereby reducing the potential for failure in this region of the seal assembly. Further yet, in being able to provide attachment of the PTFE seal element to the metal carrier via a low cost elastomeric material, the seal assembly is economical in manufacture.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
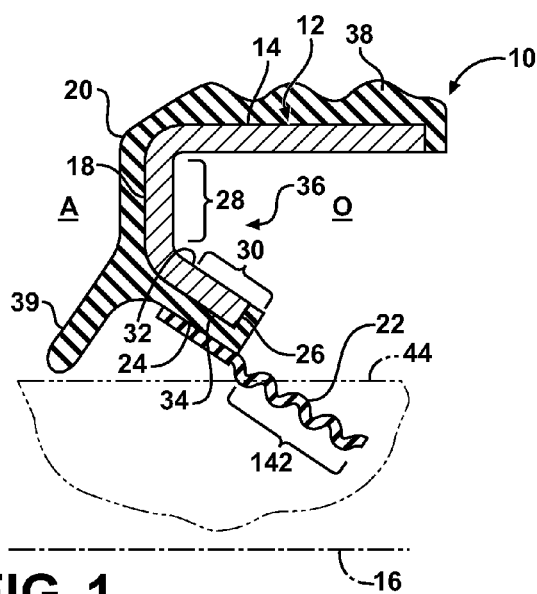
FIG. 1 is a cross-sectional view of a shaft seal assembly constructed in accordance with one aspect of the invention shown in an uninstalled state.

Referring in more detail to the drawings, FIG. 1 illustrates a rotary shaft seal assembly, referred to hereafter as assembly, constructed in accordance with the invention generally at 10. The assembly 10 has an outer metal case 12, represented here, by way of example and without limitation, as being generally L-shaped, having an outer wall 14 that extends cylindrically or substantially cylindrically about a central axis 16 of the assembly 10 and a leg 18 that extends radially inwardly from the wall 14 toward the central axis 16. It should be recognized that the shape of the case 12 is not limited to the shape illustrated, and that any suitable shape configured for attached to an outer housing is contemplated to be within the scope of the claims. The assembly 10 further includes an elastomeric material 20, e.g. low cost rubber, bonded to the leg 18, and a PTFE seal element 22 bonded to the elastomeric material 20, with the elastomeric material 20 forming a seal element bond joint, referred to hereafter as bond joint 24, sandwiched between the PTFE seal element 22 and the leg 18. The bond joint 24 is spaced radially inwardly from the leg 18 and in radial alignment with the leg 18. In use, the bond joint 24 is isolated or substantially isolated from flexing movement, thereby allowing an active sealing portion of the PTFE seal element 22 to flex as necessary to provide a reliable seal.

Figure 2:
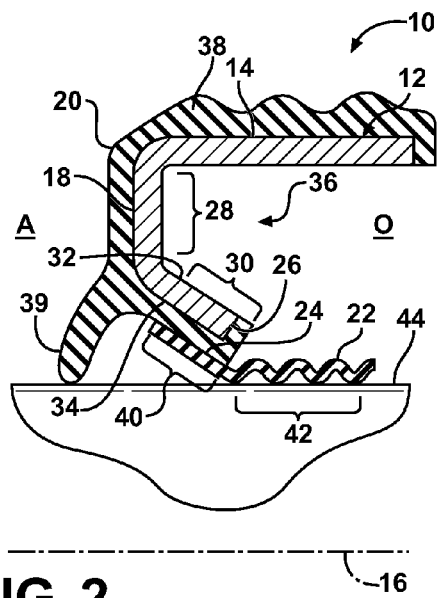
FIG. 2 is a view of the shaft seal assembly of FIG. 1 shown in an installed state.

The case leg 18 extends radially inwardly to a free end 26. In the embodiment shown in FIGS. 1 and 2, the leg 18 has a first portion 28 that extends transversely or substantially transversely to the axis 16 and a second portion 30 that extends from the first portion 28 to the free end 26. The second portion 30 is generally frustroconical and extends from the first portion 28 radially beneath the outer wall 14 in radially spaced and radially aligned relation with at least a portion of the outer wall 14. The second portion 30 is formed in part by an inner surface 32 of the case 12 that is inclined to face generally toward the outer wall 14 and an outer surface 34 of the case 12 that is inclined to face generally toward the axis 16. As such, the inner and outer surfaces 32, 34 extend obliquely to the axis 16, wherein the inner surface 32 is inclined facing generally toward an oil side O of the assembly 10 and the outer surface 34 is inclined facing generally toward an air side A of the assembly 10. As such, an enclosed annular pocket 36 is bounded between the outer surface 32, the first portion 28 and the outer wall 14, wherein the pocket 36 faces the oil side O of the assembly 10.

The elastomeric material 20, aside from forming the bond joint 24, can be molded about the entire or substantially the entire outer surface 34 of the case 12. As such, a radially outermost portion 38 of the elastomeric material 20 can be molded about the outer surface 34 of the outer wall 14, wherein the outermost portion 38 is sized on diameter to be received in a bore of a housing (not shown), such as in a line-to-line or slight interference press fit. In addition, the elastomeric material 20 can be molded about the outer surface 34 of the leg first portion 28. Accordingly, the entire outer surface 34 of the leg 18 can be covered with the elastomeric material 20, thereby providing protection against to the case 12 against corrosion. Further yet, the elastomeric material 20 can be molded to form an annular exclusion lip 39. The exclusion lip 39 is illustrated here, by way of example, as depending from the bond joint between the first and second portions 28, 30 of the leg 18 generally away from the PTFE seal element 22 toward the air side A of the assembly 10 to inhibit contaminants from reaching the PTFE seal element 22.

The PTFE seal element 22 has a first bonded portion 40 and a second unsupported, non-bonded portion 42. The bonded portion 40 extends along the bond joint 24, which extends along the length or substantially along the length of the leg second portion 30. The non-bonded portion 42 extends radially inwardly generally toward the axis 16 beyond the bond joint 24 and beyond the free end 26 of the leg 18. As such, the non-bonded portion 42 forms an unsupported portion that extends in radial alignment with at least a portion of the outer wall 14. Upon being molded to the case 12, and while in an uninstalled state, the unsupported portion 42 extends radially inwardly beyond a shaft running surface, such that upon being installed about the shaft, the active sealing portion of the unsupported portion 42 is caused to sealingly engage the shaft with an amount of bias that is predetermined, based on the physical and material characteristics of the unsupported portion 42. While installed, the flexing of the PTFE seal element 22 against the shaft occurs entirely over the unsupported portion 42, and not within the bond joint 24. Accordingly, the amount of flex of the unsupported portion 42 and the magnitude of sealing force imparted by the unsupported portion 42 can be tightly controlled.

To facilitate flexing of the active sealing portion of the unsupported portion 42 of the PTFE sealing element 22 against the shaft during use, the unsupported portion 42 can be formed having an undulating wall, such as in a coining process, for example. The undulating wall can be formed having a symmetrical, uniform wall thickness along its length, or it can be formed having a non-symmetrical wall thickness, thereby providing reduced thickness annular flex joints between thickened regions of the wall.

Figure 3:
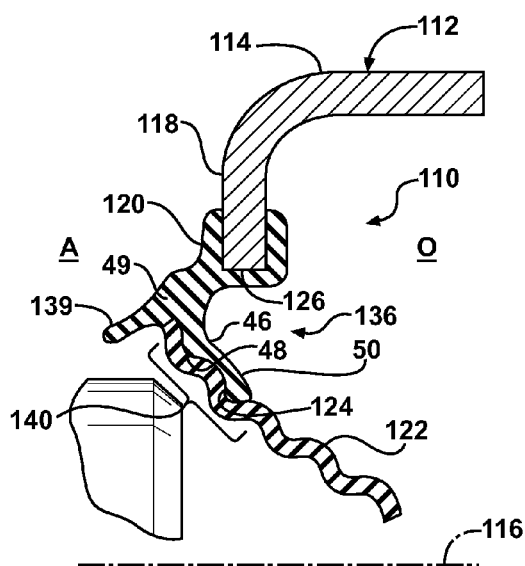
FIG. 3 is a cross-sectional view of a shaft seal assembly constructed in accordance with another aspect of the invention shown in an uninstalled state.
Figure 4:
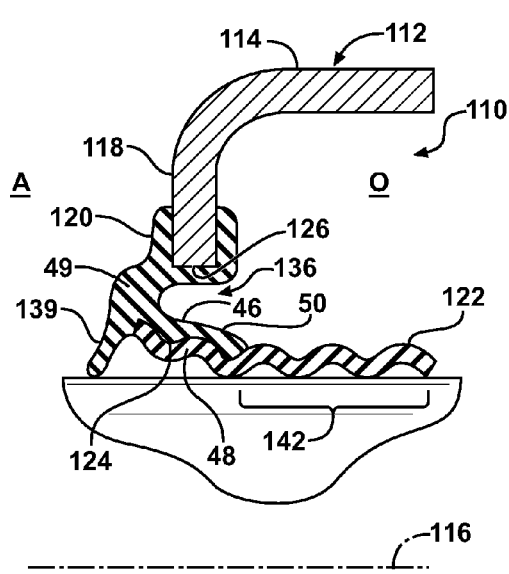
FIG. 4 is a view of the shaft seal assembly of FIG. 3 shown in an installed state.

In FIGS. 3 and 4, a shaft seal assembly 110 constructed in accordance with another aspect of the invention is illustrated, wherein the same reference numerals, offset by a factor of 100, are used to indicated like features discussed above. The assembly 110 has a case 112 with a cylindrical outer wall 114 and a leg 118. The leg 118 extends transversely or substantially transversely inwardly from the outer wall 114 toward a central axis 116 to a free end 126. As such, the case 112 is generally L-shaped in cross-section.

An elastomeric material 120 is bonded to the free end 126, wherein the elastomeric material 120 forms a frustroconical annulus 46 that converges radially inwardly from an "as molded" reverse hinge region 49 toward an oil side O of the assembly 110 to provide a radially inwardly facing bonding surface 48 and a radially outwardly facing surface 50. Further, the elastomeric material 120 is formed having an exclusion lip 139 diverging toward an air side A of the assembly. The bonding surface 46, while in a free, unbiased and unassembled state, converges obliquely to the axis 116 and toward the oil side O of the assembly, while the surface 50 opposite the bonding surface 48 is spaced radially inwardly in radial alignment from the free end 126 of the leg 118 to provide an annular V-shaped pock 136 between the free end 126 and the surface 50.

The seal assembly 110 has a PTFE seal element 122 with a first bonded portion 140 and a second unsupported, non-bonded portion 142, as discussed above. The bonded portion 140 is bonded to the bonding surface 48 of the elastomeric material 120 along a bond joint 124, wherein the bond joint 124 is spaced radially inwardly in radial alignment with the free end 126 of the leg 118. The non-bonded portion 142 extends radially inwardly generally toward the axis 116 beyond the bond joint 124 to form an unsupported portion 142 of the PTFE seal element 122 that extends in radial alignment with at least a portion of the outer wall 114, as discussed above. When installed, flexing of the PTFE seal element 122 against the shaft occurs substantially over the unsupported portion 142, and not within the bond joint 124, as discussed above, although a controlled amount of flex can occur in the hinge region 49 spaced from the bond joint 124. Accordingly, the amount of flex of the unsupported portion 142 and the magnitude of sealing force imparted by the unsupported portion 142 can be tightly controlled.

Obviously, many modifications and variations of the present invention are possible in light of the above teachings. It is, therefore, to be understood that within the scope of the appended claims, the invention may be practiced otherwise than as specifically described.

What is claimed is:

1. A shaft seal assembly, comprising:
a metal case having a wall extending cylindrically about a central axis with an annular leg extending radially inwardly from said wall toward said central axis;
an elastomeric material bonded to said leg;
a PTFE seal element attached directly to said elastomeric material at a bond joint formed by said elastic material, said bond joint converging radially inwardly toward an oil side of the seal assembly in oblique relation to said central axis in radially inwardly spaced, radial alignment with said leg;
wherein said leg has a first portion extending from said wall substantially transversely to said central axis and a second portion extending radially inwardly from said first portion, said second portion extending obliquely relative to said central axis to a free end to form an annular pocket bounded by said wall, said first portion and said second portion;
wherein said PTFE seal element has an unsupported portion that extends beyond said bond joint; and
entire said PTFE seal element is within first and second distal ends of said wall.

2. The shaft seal assembly of claim 1 wherein said leg extends to said free end, said bond joint being spaced in its entirety radially inwardly from said free end.

3. The shaft seal assembly of claim 1 wherein said second portion of said leg has a surface facing radially inwardly toward said central axis, said bond joint extending substantially parallel to said surface.

4. The shaft seal assembly of claim 3 wherein said second portion of said leg is radially aligned with at least a portion of said wall.

5. The shaft seal assembly of claim 1 wherein said unsupported portion of said PTFE seal element extends in radial alignment with said wall.

6. The shaft seal assembly of claim 1 further including an annular exclusion lip molded from said elastomeric material, said annular exclusion lip extending toward said central axis and generally away from said PTFE seal element.

7. A shaft seal assembly, comprising:
a metal case having a wall extending cylindrically about a central axis with an annular leg extending radially inwardly from said wall toward said central axis, said annular leg has a portion that extends obliquely to a free end toward said central axis, wherein said portion of said leg has a surface facing radially inwardly toward said central axis;
an elastomeric material bonded to said leg;

a PTFE seal element bonded directly to said elastomeric material at a bond joint, said bond joint being formed in its entirety in radial alignment with said leg and being spaced radially inwardly from said leg, wherein said bond joint is radially inward from said surface of said leg;

wherein said PTFE seal element has an unsupported portion that extends beyond said bond joint toward an oil side of the assembly; and entire said PTFE seal element is within first and second distal ends of said wall.

8. The shaft seal assembly of claim 7 wherein said unsupported portion of said PTFE seal element extends in radial alignment with said wall.

9. The shaft seal assembly of claim 7 further including an annular exclusion lip molded from said elastomeric material, said annular exclusion lip extending toward said central axis and generally away from said PTFE seal element.

\* \* \* \* \*